US011199412B2

(12) United States Patent
Kordari et al.

(10) Patent No.: US 11,199,412 B2
(45) Date of Patent: *Dec. 14, 2021

(54) COLLABORATIVE CREATION OF INDOOR MAPS

(71) Applicant: TRX SYSTEMS, INC., Greenbelt, MD (US)

(72) Inventors: Kamiar Kordari, McLean, VA (US); Benjamin Funk, Hanover, MD (US); Carole Teolis, Glenn Dale, MD (US); Jared Napora, Severn, MD (US); John Karvounis, Bowie, MD (US); Dan Hakim, Silver Spring, MD (US); Christopher Giles, Prince Frederick, MD (US); Carol Politi, Bethesda, MD (US)

(73) Assignee: TRX SYSTEMS, INC., Greenbelt, MD (US)

( * ) Notice: Subject to any disclaimer, the term of this patent is extended or adjusted under 35 U.S.C. 154(b) by 254 days.

This patent is subject to a terminal disclaimer.

(21) Appl. No.: 16/022,526

(22) Filed: Jun. 28, 2018

(65) Prior Publication Data

US 2018/0321043 A1 Nov. 8, 2018

Related U.S. Application Data

(63) Continuation of application No. 15/650,747, filed on Jul. 14, 2017, now Pat. No. 10,352,707, which is a
(Continued)

(51) Int. Cl.
*G01C 21/20* (2006.01)

(52) U.S. Cl.
CPC .................. *G01C 21/206* (2013.01)

(58) Field of Classification Search
CPC ..................................................... G01C 21/206
(Continued)

(56) References Cited

U.S. PATENT DOCUMENTS 5,552,772 A 9/1996 Janky et al.
5,583,776 A 12/1996 Levi et al.
(Continued)

FOREIGN PATENT DOCUMENTS

WO WO 2002/056274 A1 7/2002
WO WO 2006/017266 A2 2/2006
(Continued)

OTHER PUBLICATIONS

U.S. Appl. No. 60/954,112, filed Aug. 6, 2007, Bandyopadhyay et al.
(Continued)

*Primary Examiner* — Jean Paul Cass
(74) *Attorney, Agent, or Firm* — BakerHostetler

(57) ABSTRACT

This disclosure provides techniques for the creation of maps of indoor spaces. In these techniques, an individual or a team with no mapping or cartography expertise can contribute to the creation of maps of buildings, campuses or cities. An indoor location system can track the location of contributors in the building. As they walk through indoor spaces, an application may automatically create a map based on data from motion sensors by both tracking the location of the contributors and also inferring building features such as hallways, stairways, and elevators based on the tracked contributors' motions as they move through a structure. With these techniques, the process of mapping buildings can be crowd sourced to a large number of contributors, making the indoor mapping process efficient and easy to scale up.

24 Claims, 11 Drawing Sheets

Related U.S. Application Data continuation of application No. 14/178,605, filed on Feb. 12, 2014, now Pat. No. 9,733,091.

(60) Provisional application No. 61/783,642, filed on Mar. 14, 2013.

(58) Field of Classification Search
USPC .......................................................... 701/422
See application file for complete search history.

(56) References Cited

U.S. PATENT DOCUMENTS

| | | |
|---|---|---|
| 5,645,077 A | 7/1997 | Foxlin |
| 5,652,570 A | 7/1997 | Lepkofker |
| 5,742,509 A | 4/1998 | Goldberg et al. |
| 5,774,385 A | 6/1998 | Bristol |
| 5,899,963 A | 5/1999 | Hutchings |
| 5,956,660 A | 9/1999 | Neumann |
| 5,977,913 A | 11/1999 | Christ |
| 5,990,793 A | 11/1999 | Bieback |
| 6,031,454 A | 2/2000 | Lovejoy et al. |
| 6,061,021 A | 5/2000 | Zibell |
| 6,072,396 A | 6/2000 | Gaukel |
| 6,100,806 A | 8/2000 | Gaukel |
| 6,122,960 A | 9/2000 | Hutchings et al. |
| 6,181,253 B1 | 1/2001 | Eschenbach et al. |
| 6,240,367 B1 | 5/2001 | Lin |
| 6,362,778 B2 | 3/2002 | Neher |
| 6,366,855 B1 | 4/2002 | Reilly et al. |
| 6,415,223 B1 | 7/2002 | Lin et al. |
| 6,474,159 B1 | 11/2002 | Foxlin et al. |
| 6,496,779 B1 | 12/2002 | Hwang |
| 6,504,483 B1 | 1/2003 | Richards et al. |
| 6,512,455 B2 | 1/2003 | Finn et al. |
| 6,522,266 B1 | 2/2003 | Soehren et al. |
| 6,622,090 B2 | 9/2003 | Lin |
| 6,631,323 B2 | 10/2003 | Tucker et al. |
| 6,658,354 B2 | 12/2003 | Lin |
| 6,681,629 B2 | 1/2004 | Foxlin et al. |
| 6,721,769 B1 | 4/2004 | Rappaport et al. |
| 6,792,353 B2 | 9/2004 | Lin |
| 6,813,582 B2 | 11/2004 | Levi et al. |
| 6,826,477 B2 | 11/2004 | Ladetto et al. |
| 6,833,811 B2 | 12/2004 | Zeitfuss et al. |
| 6,847,892 B2 | 1/2005 | Zhou et al. |
| 6,850,844 B1 | 2/2005 | Walters et al. |
| 6,898,559 B2 | 5/2005 | Saitta |
| 6,900,732 B2 | 5/2005 | Richards |
| 6,922,632 B2 | 7/2005 | Foxlin |
| 6,944,542 B1 | 9/2005 | Eschenbach |
| 6,995,665 B2 | 2/2006 | Appelt et al. |
| 7,000,469 B2 | 2/2006 | Foxlin et al. |
| 7,015,831 B2 | 3/2006 | Karlsson et al. |
| 7,034,678 B2 | 4/2006 | Burkley et al. |
| 7,091,851 B2 | 8/2006 | Mason et al. |
| 7,091,852 B2 | 8/2006 | Mason et al. |
| 7,103,471 B2 | 9/2006 | Levi et al. |
| 7,106,189 B2 | 9/2006 | Burneske et al. |
| 7,135,992 B2 | 11/2006 | Karlsson et al. |
| 7,143,130 B2 | 11/2006 | Lin |
| 7,145,478 B2 | 12/2006 | Goncalves et al. |
| 7,161,504 B2 | 1/2007 | Linn |
| 7,162,338 B2 | 1/2007 | Goncalves et al. |
| 7,177,737 B2 | 2/2007 | Karlsson et al. |
| 7,199,754 B2 | 4/2007 | Krumm et al. |
| 7,203,497 B2 | 4/2007 | Belcea |
| 7,236,880 B2 | 6/2007 | Fager et al. |
| 7,239,277 B2 | 7/2007 | Fullerton et al. |
| 7,239,953 B2 | 7/2007 | Braunberger et al. |
| 7,245,215 B2 | 7/2007 | Gollu et al. |
| 7,245,216 B2 | 7/2007 | Burkley et al. |
| 7,250,907 B2 | 7/2007 | Krumm et al. |
| 7,259,656 B1 | 8/2007 | Wright |
| 7,263,379 B1 | 8/2007 | Parkulo et al. |
| 7,272,467 B2 | 9/2007 | Goncalves et al. |
| 7,295,119 B2 | 11/2007 | Rappaport et al. |
| 7,301,648 B2 | 11/2007 | Foxlin |
| 7,302,359 B2 | 11/2007 | McKitterick |
| 7,305,303 B2 | 12/2007 | Soehren et al. |
| 7,377,835 B2 | 5/2008 | Parkulo et al. |
| 7,379,015 B2 | 5/2008 | Workman |
| 7,389,207 B2 | 6/2008 | Saitta |
| 7,400,246 B2 | 7/2008 | Breeding |
| 7,403,853 B1 | 7/2008 | Janky et al. |
| 7,405,658 B2 | 7/2008 | Richards |
| 7,421,340 B2 | 9/2008 | Ladetto et al. |
| 7,423,580 B2 | 9/2008 | Markhovsky et al. |
| 7,516,039 B2 | 4/2009 | McKitterick |
| 7,538,715 B2 | 5/2009 | Langford et al. |
| 7,573,403 B2 | 8/2009 | Goncalves et al. |
| 7,587,274 B2 | 9/2009 | Kaldewey et al. |
| 7,646,336 B2 | 1/2010 | Tan et al. |
| 7,672,781 B2 | 3/2010 | Churchill et al. |
| 7,679,532 B2 | 3/2010 | Karlsson et al. |
| 7,689,321 B2 | 3/2010 | Karlsson |
| 7,701,347 B2 | 4/2010 | Richards |
| 7,706,964 B2 * | 4/2010 | Horvitz .............. G01C 21/3492 701/117 |
| 7,725,253 B2 | 5/2010 | Foxlin |
| 7,747,409 B2 | 6/2010 | Ladetto et al. |
| 8,284,100 B2 * | 10/2012 | Vartanian ........... G06Q 30/0267 342/357.3 |
| 8,296,058 B2 | 10/2012 | Koskan et al. |
| 8,423,042 B2 | 4/2013 | Markhovsky et al. |
| 8,630,741 B1 * | 1/2014 | Matsuoka ................ F24F 11/30 700/276 |
| 8,706,414 B2 | 4/2014 | Funk et al. |
| 8,731,817 B2 | 5/2014 | Ballew et al. |
| 8,756,173 B2 * | 6/2014 | Hunzinger .......... G06K 9/00348 706/12 |
| 8,923,892 B2 * | 12/2014 | Zhou ............... H04W 36/00835 455/456.6 |
| 9,100,899 B2 * | 8/2015 | Meshkati .............. H04W 48/16 |
| 9,429,432 B2 * | 8/2016 | McClernon ............ G01C 21/20 |
| 9,509,968 B2 * | 11/2016 | Zimmermann .... H04N 21/4828 |
| 9,720,505 B2 * | 8/2017 | Gribetz .............. G06F 3/04815 |
| 9,733,091 B2 * | 8/2017 | Kordari ............... G01C 21/383 |
| 10,162,362 B2 * | 12/2018 | Tsai .................... G01C 21/165 |
| 10,192,113 B1 * | 1/2019 | Liu .................... G06K 9/00791 |
| 10,636,207 B1 * | 4/2020 | Swidersky ............. G06T 15/20 |
| 2001/0026240 A1 | 10/2001 | Neher |
| 2002/0010694 A1 | 1/2002 | Navab et al. |
| 2002/0026283 A1 | 2/2002 | Tucker et al. |
| 2002/0072881 A1 | 6/2002 | Saitta |
| 2002/0193091 A1 | 12/2002 | Zmarthie |
| 2003/0018430 A1 | 1/2003 | Ladetto et al. |
| 2003/0045998 A1 | 3/2003 | Medl |
| 2003/0135324 A1 | 7/2003 | Navab |
| 2003/0144795 A1 | 7/2003 | Lin |
| 2003/0158635 A1 | 8/2003 | Pillar et al. |
| 2003/0158664 A1 | 8/2003 | Swope et al. |
| 2003/0191582 A1 | 10/2003 | Terada |
| 2003/0214410 A1 | 11/2003 | Johnson et al. |
| 2003/0216865 A1 * | 11/2003 | Riewe ................... B61L 25/021 701/470 |
| 2004/0021569 A1 | 2/2004 | Lepkofker et al. |
| 2004/0066316 A1 | 4/2004 | Ogawa et al. |
| 2004/0066329 A1 | 4/2004 | Zeitfuss et al. |
| 2004/0073360 A1 | 4/2004 | Foxlin |
| 2004/0148125 A1 | 7/2004 | Fager et al. |
| 2004/0167688 A1 | 8/2004 | Karlsson et al. |
| 2005/0033515 A1 | 2/2005 | Bozzone |
| 2005/0060088 A1 | 3/2005 | Helal et al. |
| 2005/0182518 A1 | 8/2005 | Karlsson |
| 2005/0197769 A1 | 9/2005 | Soehren et al. |
| 2005/0228613 A1 | 10/2005 | Fullerton et al. |
| 2005/0234679 A1 | 10/2005 | Karlsson |
| 2005/0242947 A1 | 11/2005 | Burneske et al. |
| 2005/0250440 A1 | 11/2005 | Zhou et al. |
| 2005/0283699 A1 * | 12/2005 | Nomura ................ G01C 21/32 714/746 |
| 2005/0289162 A1 * | 12/2005 | Saitta ...................... A62B 3/00 |
| 2006/0002590 A1 | 1/2006 | Borak |
| 2006/0023681 A1 | 2/2006 | A'Rafat |

(56) References Cited

U.S. PATENT DOCUMENTS

| | | |
|---|---|---|
| 2006/0026078 A1* | 2/2006 | King .................. G06F 16/41 382/306 |
| 2006/0027404 A1 | 2/2006 | Foxlin |
| 2006/0074540 A1 | 4/2006 | Braunberger et al. |
| 2006/0125644 A1 | 6/2006 | Sharp |
| 2006/0167649 A1* | 7/2006 | Alexander ............ A63F 13/211 702/160 |
| 2006/0195254 A1 | 8/2006 | Ladetto et al. |
| 2006/0256001 A1 | 11/2006 | Markhovsky et al. |
| 2006/0267833 A1* | 11/2006 | Langford .............. G01S 5/0252 342/174 |
| 2006/0287824 A1 | 12/2006 | Lin |
| 2007/0001904 A1 | 1/2007 | Mendelson |
| 2007/0032748 A1 | 2/2007 | McNeil et al. |
| 2007/0050129 A1 | 3/2007 | Salmre |
| 2007/0073482 A1 | 3/2007 | Churchill et al. |
| 2007/0075898 A1 | 4/2007 | Markhovsky et al. |
| 2007/0090973 A1 | 4/2007 | Karlsson et al. |
| 2007/0093962 A1 | 4/2007 | Swope et al. |
| 2007/0126623 A1 | 6/2007 | Workman |
| 2007/0139200 A1 | 6/2007 | Yushkov et al. |
| 2007/0150195 A1 | 6/2007 | Koskan et al. |
| 2007/0168126 A1 | 7/2007 | Wence et al. |
| 2007/0168127 A1 | 7/2007 | Zaruba et al. |
| 2007/0185681 A1 | 8/2007 | McKitterick |
| 2007/0219711 A1 | 9/2007 | Kaldewey et al. |
| 2007/0222674 A1 | 9/2007 | Tan et al. |
| 2007/0241886 A1 | 10/2007 | Breeding |
| 2007/0260418 A1 | 11/2007 | Ladetto et al. |
| 2007/0262884 A1 | 11/2007 | Goncalves et al. |
| 2007/0271011 A1 | 11/2007 | Lee et al. |
| 2007/0271037 A1 | 11/2007 | Overstreet et al. |
| 2007/0281745 A1 | 12/2007 | Parkulo et al. |
| 2007/0282565 A1 | 12/2007 | Bye et al. |
| 2008/0004796 A1 | 1/2008 | Schott et al. |
| 2008/0036594 A1 | 2/2008 | Kates |
| 2008/0040071 A1 | 2/2008 | McKitterick |
| 2008/0077326 A1 | 3/2008 | Funk et al. |
| 2008/0150724 A1 | 6/2008 | Richards |
| 2008/0186161 A1 | 8/2008 | Fussner et al. |
| 2009/0043504 A1 | 2/2009 | Bandyopadhyay et al. |
| 2009/0216438 A1 | 8/2009 | Shafer |
| 2010/0138142 A1* | 6/2010 | Pease .................. B60L 58/24 701/123 |
| 2010/0177970 A1* | 7/2010 | King .................... G06F 40/143 382/229 |
| 2011/0082643 A1 | 4/2011 | Huseth et al. |
| 2012/0105202 A1 | 5/2012 | Gits et al. |
| 2012/0130632 A1 | 5/2012 | Bandyopadhyay et al. |
| 2012/0143495 A1* | 6/2012 | Dantu ................ G01C 21/206 701/428 |
| 2012/0249372 A1* | 10/2012 | Jovicic ................ H04W 64/00 342/451 |
| 2012/0290950 A1* | 11/2012 | Rapaport ........... H04N 21/8358 715/753 |
| 2013/0053056 A1* | 2/2013 | Aggarwal ............ H04W 4/029 455/456.1 |
| 2013/0166195 A1 | 6/2013 | Bandyopadhyay et al. |
| 2013/0166198 A1 | 6/2013 | Funk et al. |
| 2013/0166202 A1 | 6/2013 | Bandyopadhyay et al. |
| 2013/0179062 A1* | 7/2013 | Yasushi .................. G06F 17/00 701/123 |
| 2014/0002240 A1* | 1/2014 | Marciniak ............... G06F 21/32 340/5.83 |
| 2014/0187258 A1* | 7/2014 | Khorashadi ........... H04W 4/023 455/456.1 |
| 2015/0033305 A1* | 1/2015 | Shear .................. G06F 21/6218 726/6 |
| 2015/0057808 A1* | 2/2015 | Cook .................... G05B 13/04 700/275 |
| 2015/0063714 A1* | 3/2015 | King .................... G06F 40/169 382/229 |
| 2015/0094089 A1* | 4/2015 | Moeglein .............. G01S 5/16 455/456.1 |
| 2015/0339570 A1* | 11/2015 | Scheffler .............. G06N 3/04 706/16 |
| 2015/0359457 A1* | 12/2015 | Blumenthal ........... G06F 3/011 73/172 |
| 2016/0255463 A1* | 9/2016 | Das ..................... H04W 64/00 455/456.1 |
| 2016/0255471 A1* | 9/2016 | Marri Sridhar ..... H04W 56/006 455/456.2 |
| 2016/0255603 A1* | 9/2016 | Venkatraman ......... G01R 29/10 455/456.1 |
| 2016/0255604 A1* | 9/2016 | Venkatraman ........ H04W 64/00 455/456.1 |
| 2018/0274932 A1* | 9/2018 | Young .................. G01C 21/32 |
| 2019/0061969 A1* | 2/2019 | Beauchesne-Martel ..................... F04D 27/0246 |

FOREIGN PATENT DOCUMENTS

| | | | |
|---|---|---|---|
| WO | WO 2008/108788 A2 | 9/2008 | |
| WO | WO 2009/021068 A1 | 2/2009 | |
| WO | WO 2010/082827 A2 | 7/2010 | |
| WO | WO-2010082827 A2 * | 7/2010 | ............. H04L 67/12 |
| WO | WO 2011/144966 A1 | 11/2011 | |

OTHER PUBLICATIONS

U.S. Appl. No. 61/049,020, filed Apr. 30, 2008, Bandyopadhyay et al.
U.S. Appl. No. 61/783,642, filed Mar. 14, 2013, Kordari et al.
U.S. Appl. No. 13/616,350, filed Sep. 14, 2012, Bandyopadhyay et al.
International Patent Application No. PCT/US2014/24881; Int'l Preliminary Report on Patentability; dated Feb. 26, 2015; 6 pages.
Leonard E. Miller; "Indoor Navigation for First Responders: A feasibility Study"; Information Technology Laboratory, National Institue of Standards adn technoloy, Feb. 10, 2006; 56 pages.
AHRS440 MEMS-Based AHRS System, Crossbow, Document Part No. 6020-0087-02 Rev B, 2-page brochure.
Bennewitz, et al., "Adapting Navigation Strategies Using Motions Patterns of People", Proceedings of the 2003 IEEE International Conference on Robotics & Automation, Taipei, Taiwan, Sep. 14-19, 2003, pp. 2000-2005.
Brown et al., "Performance Test Results of an Integrated GPS/MEMS Inertial Navigation Package", Proceedings of ION GNSS 2004, Long Beach, California, Sep. 2004, 8 pages.
Clipp., Brian, "Simultaneous Localization and Mapping", Comp 790-072 Robotics, PowerPoint Presentation, [No. date], 47 slides.
Cross et al., "Intelligent Navigation, Inertial Integration, Double Assistance for GPS", GPS World, May 1, 2002, 7 pages.
Cyganski et al., "Performance Limitations of a Precision Indoor Positioning System Using a Multi-Carrier Approach", ION NTM 2005, San Diego, California, Jan. 24-26, 2005, pp. 1093-1100.
Cyganski et al., "WPI Precision Personnel Locator System—Indoor Location Demonstrations and RF Design Improvements", Electrical and Computer Engineering Department, Worcester Polytechnic Institute, [no date], pp. 511-521.
DeSouza et al., "Vision for Mobile Robot Navigation: A Survey", IEEE Transactions on Pattern Analysis and Machine Intelligence, vol. 24, No. 2, Feb. 2002, pp. 237-267.
Diebel, J., et al., "Simultaneous Localization and Mapping with Active Stereo Vision", Proceedings of 2004 IEEE/RSJ International Conference on Intelligent Robots and Systems, Sendai, Japan, Sep. 28-Oct. 2, 2004, pp. 3436-3443.
Doucet et al., "Monte Carlo Methods for Signal Processing: A Review in the Statistical Signal Processing Context", IEEE Signal Processing Magazine, Nov. 2005, pp. 152-170.
Durrant-Whyte et al., "Simultaneous Localization and Mapping: Part I", Tutorial, IEEE Robotics & Automation Magazine, Jun. 2006, pp. 99-108.
Durrant-Whyte, Hugh, "Uncertain Geometry in Robotics", IEEE Journal of Robotics and Automation, vol. 4, No. 1, Feb. 1988, pp. 23-31.

(56) References Cited

OTHER PUBLICATIONS

Foxlin, Eric, "Intertial Head-Tracker Sensor Fusion by a Complementary Separate-Bias Kalman Filter", Proceedings of VRAIS '96, .COPYRGT. 1996 IEEE, pp. 185-194.
Foxlin, Eric, "Pedestrian Tracking with Shoe-Mounted Inertial Sensors", Moving Mixed Reality into the Real World, published by the IEEE Computer Society, Nov./Dec. 2005, pp. 38-46.
Godha et al., "Integrated GPS/INS System for Pedestrian Navigation in a Signal Degraded Environment", ION GNSS 2006, Fort Worth, Texas, Sep. 26-29, 2006, 14 pages.
Jensfelt et al., "A Framework for Vision Based Bearing Only 3D SLAM", Proceedings of the 2006 IEE International Conference on Robotics and Automation, Orlando, Florida, May 2006, pp. 1944-1950.
Lemaire et al., "A Practical 3D Bearing-Only SLAM Algorithm", LAAS-CNRS, Toulouse, France, 6 pages.
Montemerlo et al., "FastSLAM 2.0: An Improved Particle Filtering Algorithm for Simultaneous Localization and Mapping that Provably Converges", [no date], 6 pages.
Park et al., "Fast Distance Computation with a Stereo Head-Eye System" BMCV 2000, LNCS 1811, .COPYRGT. 2000, pp. 434-443.
Se et al., "Vision-Based Global Localization and Mapping for Mobile Robots", IEEE Transactions on Robotics, vol. 21, No. 3, Jun. 2005, pp. 364-375.
Smith et al., "Estimating Uncertain Spatial Relationships in Robotics", SRI International, [no date], 26 pages.
Yi et al., "An Omnidirectional Stereo Vision System Using a Single Camera", .COPYRGT. 2006 IEEE, 6 pages.
U.S. Appl. No. 12/187,067—U.S. Non-Final Office Action dated Dec. 9, 2010, 5 pages.
AGNC Coremicro.RTM. AHRS/INS Unit Specification, GSA Contract No. GS-24F-0014K, .COPYRGT. 1986-2006 American GNC Corporation, 1 page.
Atair Aerospace Circinus Overview, GPS-Integrated IMU, http://www.atairaerospace.com/circinus/, .COPYRGT. 2008 Atair Aerospace, Inc., 4 pages.
Bailey et al., "Simultaneous Localization and Mapping (SLAM): Part II", Tutorial, IEEE Robotics & Automation Magazine, Sep. 2006, pp. 108-117.
Group 1 Solutions, Inc. Press Release, "Remote Access.TM. Showcased at Fire Rescue International Advanced Technology Center", Sep. 15, 2006, 1 page.
HG1900 MEMS IMU (Inertial Measurement Unit), "Next-Generation Inertial Measurement Unit Provides Sophisticated Guidance for Tactical Military Applications", Honeywell, .COPYRGT. 2004, Mar. 2005, 2-page brochure.
Langelaan, et al., "Passive GPS-Free Navigation for Small UAVs", IEEEAC Paper No. 1132, .COPYRGT. 2005 IEEE, 9 pages.
Lee et al., "A Performance Analysis of a Tightly Coupled GPS/Inertial System for Two Integrity Monitoring Methods", .COPYRGT. 1999, The MITRE Corporation, Center for Advanced Aviation System Development (CAASD), McLean, Virginia, 14 pages.
Life-Line Wireless Environment & Safety Monitoring System, .COPYRGT. 2006, Safe Environment Engineering, http://www.safeenv.com, one page.
MEMSense .mu.IMU Micro Inertial Measurement Unit, Series Documentation, Document DN00009, Revision 2.8, Nov. 2007, 12 pages.
MEMSense nIMU Nano Inertial Measurement Unit, Series Documentation, Document DN00010, Version 2.9, Nov. 2007, 15 pages.
Montemerlo et al., "Conditional Particle Filters for Simultaneous Mobile Robot Localization and People-Tracking", Proceedings of the 2002 IEEE International Conference on Robotics & Automation, Washington, D.C., May 2002, 7 pages.
U.S. Appl. No. 12/187,067—U.S. Final Office Action dated Aug. 22, 2012, 11 pages.
European Patent Application No. 08797306.1—Supplementary European Search Report dated Aug. 28, 2012, 8 pages.
Spassov, "Algorithms for Map-Aided Autonomous Indoor Pedestrian Positioning and Navigation," PhD Thesis, Ecole Polytechnique Federale de Lausanne (EPFL), Lausanne, Publ. No. 3961, 2007; 139 pages.
Spassov et al. 2006. "Bayesian Approach for Indoor Pedestrian Localisation". In Proc. of the 6th Swiss Transport Research Conference, Ascona, Switzerland, Mar. 15-17, 2006; 14 pages.
Spassov, I. et al. "Map Matching for Pedestrians via Bayesian Inference". In Proceedings of the European Navigation Conference—Global Navigation Satellite Systems, Manchester, UK, May 7-10, 2006; 10 pages.
European Patent Application No. 08797306.1—European Search Opinion and Supplemental European Search Report; dated Sep. 5, 2012; 9 pages.
International Patent Application No. PCT/US2007/013039—International Search Report and Written Opinion dated Sep. 10, 2008, 3 pages.
International Patent Application No. PCT/US2008/072378—International Search Report and Written Opinion dated Nov. 3, 2008, 3 pages.
International Patent Application No. PCT/US2008/072378—International Preliminary Report on Patentability dated Feb. 9, 2010, 4 pages.
Singapore Patent Application No. 200808868-4—Search Report performed by the Australian Patent Office dated Oct. 29, 2009, 4 pages.
Singapore Patent Application No. 200808868-4—Written Opinion performed by the Australian Patent Office dated Oct. 29, 2009, 6 pages.
Singapore Patent Application No. 200808868-4—Second Written Opinion performed by the Australian Patent Office dated Jul. 5, 2010, 7 pages.
Australian Patent Application No. 2007348326—Examiner's Report dated Oct. 8, 2010, 2 pages.
U.S. Appl. No. 11/756,412—U.S. Non-Final Office Action dated Oct. 26, 2009, 8 pages.
U.S. Appl. No. 11/756,412—U.S. Non-Final Office Action dated Jun. 21, 2010, 22 pages.
U.S. Appl. No. 11/756,412—U.S. Final Office Action dated Feb. 4, 2011, 38 pages.
U.S. Appl. No. 11/756,412—U.S. Notice of Allowance dated Aug. 29, 2012, 21 pages.

* cited by examiner

COLLABORATIVE CREATION OF INDOOR MAPS

CROSS REFERENCE TO RELATED APPLICATIONS

This application is a continuation of U.S. patent application Ser. No. 15/650,747, filed Jul. 14, 2017, which is a continuation of U.S. patent application Ser. No. 14/178,605, filed Feb. 12, 2014, now U.S. Pat. No. 9,733,091, issued Aug. 15, 2017, which claims benefit under 35 U.S.C. § 119(e) of Provisional U.S. Patent Application No. 61/783,642, filed Mar. 14, 2013, the contents of which are incorporated herein by reference in their entireties.

This application is related by subject matter to that which is disclosed in U.S. patent application Ser. No. 11/756,412, filed May 31, 2007, now U.S. Pat. No. 8,688,375, issued Apr. 1, 2014; U.S. patent application Ser. No. 12/187,067, filed Aug. 6, 2008, now U.S. Pat. No. 9,448,072, issued Sep. 20, 2016; U.S. patent application Ser. No. 13/301,491, filed Nov. 21, 2011, now U.S. Pat. No. 8,712,686, issued Apr. 29, 2014; U.S. patent application Ser. No. 13/616,323, filed Sep. 14, 2012, now U.S. Pat. No. 8,706,414, issued Apr. 22, 2014; U.S. patent application Ser. No. 13/616,350, filed Sep. 14, 2012, now U.S. Pat. No. 9,046,373, issued Jun. 2, 2015; U.S. patent application Ser. No. 13/616,370, filed Sep. 14, 2012, now U.S. Pat. No. 8,965,688, issued Feb. 24, 2015; and U.S. patent application Ser. No. 13/616,408, filed Sep. 14, 2012, now U.S. Pat. No. 9,008,962, issued Apr. 14, 2015; the entirety of each application is hereby incorporated by reference herein.

GOVERNMENT RIGHTS

This invention was made with government support under IIP-1214461, awarded by the National Science Foundation. The Government has certain rights in the invention.

BRIEF SUMMARY

The present disclosure relates to geospatial mapping, and in particular, geospatial mapping using a navigation unit and a smart phone. However, from here forward the term navigation unit is used to refer to any hardware that contains the needed navigation sensors.

BACKGROUND

Current geospatial databases are primarily sources for outdoor two dimensional (2D) maps. In recent years there has been an explosion of mapping applications on the web such as GOOGLE MAPS and BING MAPS. These websites give the public access to huge amounts of geographic data. Some of them, like GOOGLE MAPS, expose an application programming interface "API" that enables users and developers to create custom applications. These toolkits commonly offer street maps, aerial/satellite imagery, geo-coding, searches, and routing functionality.

So far, the only proven method to build a great digital mapping system is to employ a large number of people to capture the necessary data. GOOGLE, with its pool of "Street View" mapping cars, is a successful example of a company that has been able to efficiently manage the big labor required for this process.

The steps required to create an accurate global database of outdoor maps include combining maps from various sources, manually correcting the data layer using the satellite images, and using alternative sources of data to verify the accuracy of map data. GOOGLE has a map creating tool, called Atlas, used by thousands of GOOGLE employees to hand correct the maps. They have access to the images from the GOOGLE Street View cars that use global positioning system (GPS) data to collect geo-referenced imagery so they know precisely where the roads are located.

A growing number of companies are now creating maps of indoor spaces, e.g. malls, airports, hospitals, and museums. Commercial and enterprise applications require indoor maps to support accurate location calculations, indoor routing, location display, asset management, location sharing, and geo-tagging.

The process of building indoor maps is different from the process of building outdoor maps. Neither satellite imagery nor GPS traces for referencing the images are available for indoor spaces, therefore alternative methods are needed to create indoor maps in a large scale.

GOOGLE has moved into mapping indoor spaces and has launched indoor maps in eight countries for more than 10,000 venues. It has digitalized maps of malls, airports and museums and has included them in GOOGLE MAPS. It has also launched a tool for the public to upload floor plans. GOOGLE has also started to collect images of indoor venues similar to those it collected for Street View using a multi-camera imaging tool they call Trekker.

GOOGLE's approach to creating maps from building blueprints or measuring spaces has some major challenges. For example, it is very labor intensive and difficult to scale. Although GOOGLE has made great progress, it has only covered a small fraction of indoor locations and a massive number of buildings are waiting to be mapped and entered into mapping and navigation systems. Creating maps is very challenging, however, a bigger challenge is to maintain and update these maps as they change over time. For example, NOKIA collects 400 data points for each road segment, and they estimate that 5 to 20 percent of these points change each year. Due to all these changes, NOKIA can never stop collecting new data from the physical world to hand correct maps. NOKIA on average makes 2.4 million map changes every day. The same maintenance problem applies to indoor maps.

A different type of indoor mapping process is disclosed in U.S. Patent Publication No. 2007/0185681, hereinafter "McKitterick." McKitterick discloses a system for mapping a room or a series of rooms by having a person (such as a soldier) sweep a range-finder around the walls of the room, and perhaps mark one or more doors and windows (such as with an X and an O, respectfully). The range-finder measures the distance from the range-finder to the walls. At the same time, information about the attitude and position of the range-finder is obtained from a six-axis inertial sensor attached to the range-finder. Maps of buildings are created by connecting individual room reconstructions collected by the range-finder using a combination of 1) knowledge of building constructs, 2) the path traveled by mapping the person as the person moves from room to room, and 3) the location of doors connecting adjacent rooms.

SUMMARY

Techniques for creation of maps of indoor spaces are described. An individual or a team with no mapping or cartography expertise can contribute to the creation of maps of buildings, campuses or cities. An indoor location system may track the location of contributors in the building. As they walk through indoor spaces, a software application may automatically create a map based on data from motion sensors in navigation units associated with the contributors by both tracking the location of the contributors and also inferring building features such as hallways, stairways, and elevators based on the tracked contributors' motions as they move through a structure. With these techniques, the process of mapping buildings can be crowd sourced to a large number of contributors, making the indoor mapping process efficient and easy to scale up.

BRIEF DESCRIPTION OF THE DRAWINGS

The drawings are provided to illustrate example embodiments described herein and are not intended to limit the scope of the disclosure.

DETAILED DESCRIPTION OF ILLUSTRATIVE EMBODIMENTS

One solution to the problems of scale in creation and maintenance of an accurate global database of indoor maps includes a combination of mobile mapping and crowd sourcing where many people can use an indoor location-enabled mobile device to contribute to the creation of indoor maps. The technical challenge in crowd sourcing includes developing the capability to merge and fuse data coming from many users to incrementally update a global map of indoor spaces.

The map generation capability described herein opens up many opportunities including the automation of a large number of previously manual mapping process steps at a level that was impossible in the past. This process may not require a professional technician; rather it may be faster and cheaper to use a crowd-sourced approach where the maps may be generated by a community of volunteers or any team that may be interested in creating indoor maps of a building, campus or city and then fusing them into a global indoor map database.

The mapping system described herein may use software for indoor navigation, which may be referred to herein as "TRX's indoor navigation software." One of the unique capabilities of TRX's indoor navigation software includes the ability to infer and geo-reference the basic features of floor plan type maps as a tracked subject moves through a structure based only on the tracked subject's motion. Floor plans may represent a specific partition of a two dimensional space into spatially characteristic areas such as hallways, rooms, points of entry or exit including stairwells, elevators, and escalators. The techniques described herein detect such building features from a person's track histories. For example, long tracks that follow a nearly linear path may be identified with a hallway.

These features were originally generated for the purpose of improving a navigation solution. Each feature may be generated with a confidence level that may be based on the current navigation solution's location confidence and whether the feature makes sense relative to what is known about how buildings are typically constructed. Postulated knowledge of hallway and grid constraints may be enforced on the navigation solution to yield an effective angular drift correction. If the correction leads to a more consistent navigation solution, then that solution may be propagated as the best current estimate. In many cases, further path segment grid alignment may be used to completely eliminate angular drift errors.

By combining the map features discovered by many tracked subjects into a building map and incrementally updating that building map as new updates are received, a team can quickly provide complete maps of buildings.

Figure 1:
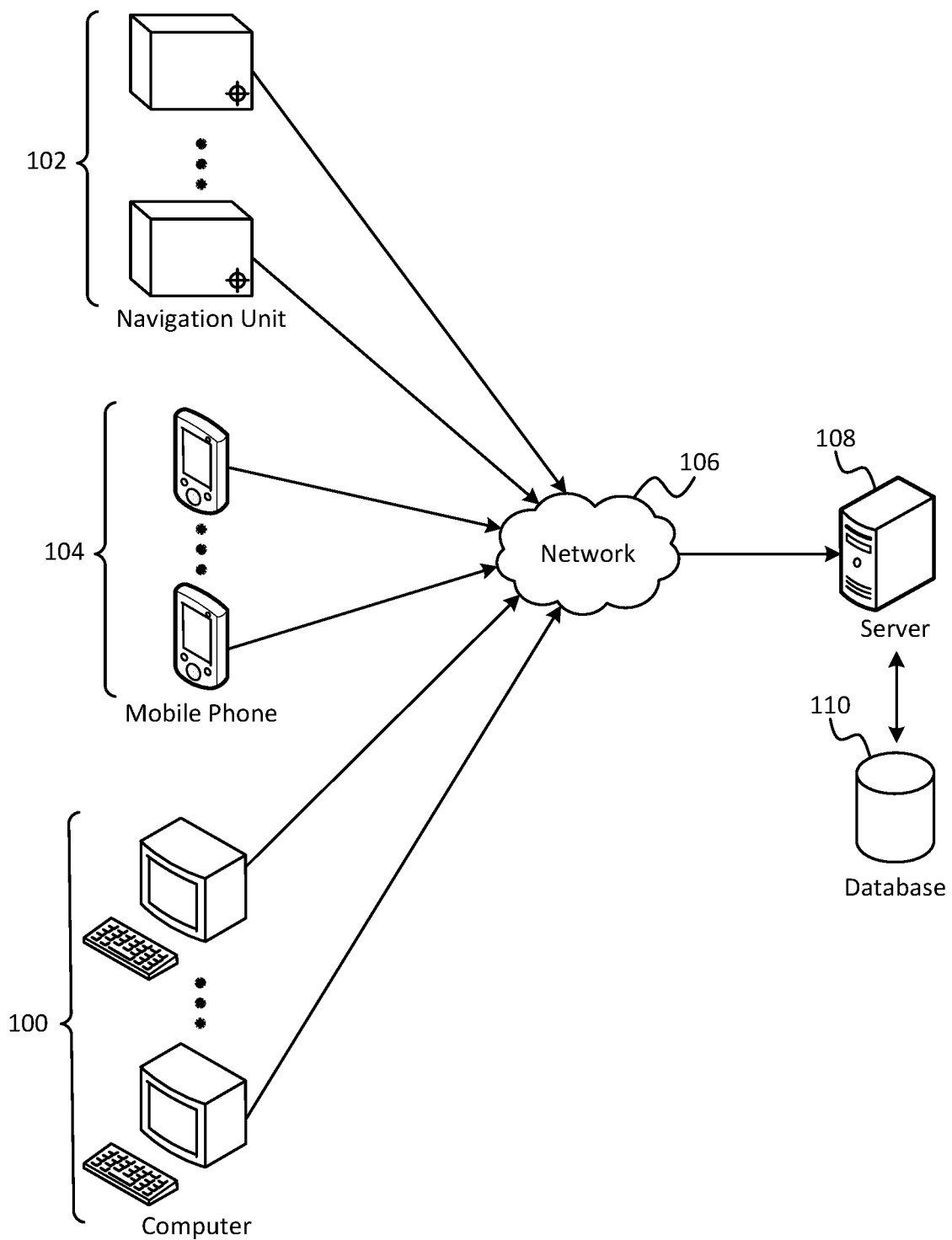
FIG. 1 illustrates an example diagram of a system, according to embodiments.

In the embodiment of FIG. 1, a single tracked subject is discussed, but the same process could be followed for a plurality of tracked subjects. The tracked subjects can use computing devices, such as computers 100 or navigation units 102, by themselves, or pair the computers 100 and/or navigation units 102 with a mobile phone 104 (e.g., an ANDROID phone), or rely solely on the navigation sensors within higher end mobile phones 104 to track their movements as they walk inside a building. Data may be collected from the sensors (inertial, pressure, magnetic field, GPS, etc.) of the computer devices. After some local processing within the computing devices, the path, features, and reliability data from each computing device may be sent over a network 106 (e.g., cellular network, WiFi, etc.) to a server 108 for further processing. The accuracy of the location estimate for each computer device may be improved by using inferred mapping corrections in combination with occasional user corrections entered through the computing device's interface, which would serve to improve the accuracy of location input to the mapping algorithms. The generated maps may be stored in a database 110 that can be managed and distributed via the server 108, or through other resources, to enable other third party applications. This fusion of data may be automatic. However, the generated maps may be manually corrected or improved by contributors or authorized users to become more accurate.

The indoor spatial data may be represented with a graph model. In this model, locations may be connected by edges if a connection between these locations exists in the real world. For instance, two rooms may be connected in the graph if there is a door between them and two floors may be connected in the graph if there are stairs that lead from one floor to the other. The edges may be weighted to model different distances. This model may allow generating views with different levels of detail.

There is a wide range of information that may be associated with each building: building global location; relative location/geometry of features within the building; function of spaces; relations to adjacent features; access points such as doors; identification information such as room name/number; and transitions to other buildings through overpasses, tunnels and the like. The fusion algorithm on the server may generate maps that have the locations of building features in global coordinates and the relations between those features. The other information, e.g., type or function of the building, can be manually entered by users into the system. This type of data may provide contextual information that may be used by the fusion algorithm to improve the accuracy of maps. For example, useful assumptions can be made about the number of exit doors in an airport versus in a museum. This contextual information can be used to filter data more accurately. For example, two different tracked subjects may discover the same hallway or stairway. Slight errors in their navigation solution may cause the discovered features to be shifted relative to each other. The system can use knowledge of building architecture to correct the map to the most probable configuration; for example, it is improbable that there are two stairways right next to each other in an office building, but not impossible.

Figure 2:
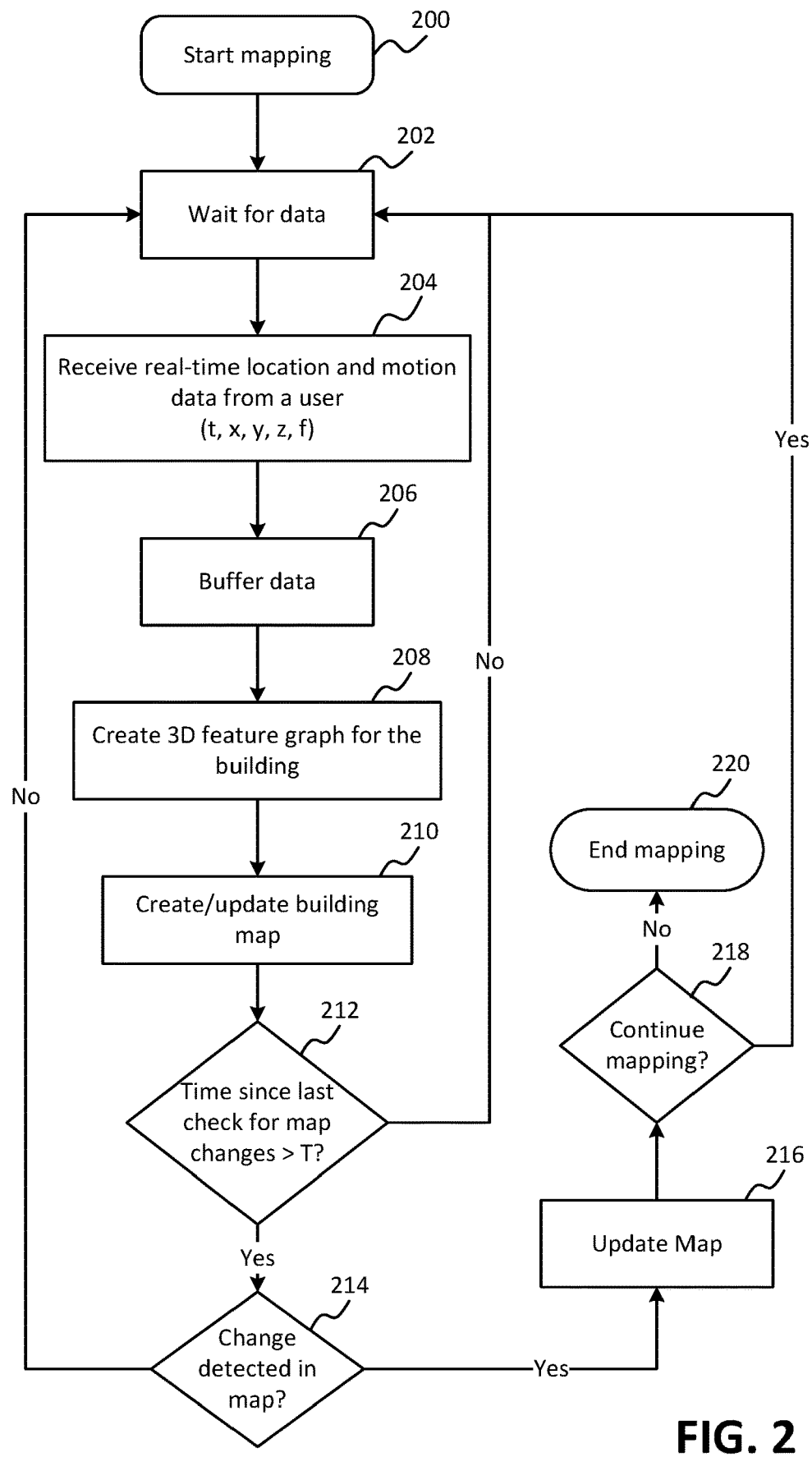
FIG. 2 illustrates an example flowchart that may be used in the example diagram of the system, according to embodiments.

FIG. 2 shows a flowchart of an embodiment of an algorithm running on the server. The illustrated process for generating a map starts at step 200. When the amount of buffered data from a tracked subject exceeds a threshold, step 202, the algorithm may start to process the data. The received data can include real-time location and motion data from the user, step 204, including three-dimensional (3D) time stamped path data providing the location of the tracked subject inside the building, and any time stamped building features. In step 206, the data is buffered as necessary. In step 208, a 3D feature graph for the building is created.

The location and confidence/error bound for the inferred features may be derived from the tracked subject's location and error bound at the time associated with the discovery of the feature. The accuracy of the location data may be quantified by an error estimate. In the process of creating tracks, the navigation algorithm may classify the user's horizontal and vertical motion (walking, running, going up stairs, taking an elevator, etc.) and fuse the resulting classifications with other sensory information to identify the location of hallways, stairs, elevators, and exits.

The track and associated building 3D feature graphs may then be processed and converted into a map, step 210, where nodes may represent features and links may represent spatial connections. In topological maps, the features/landmarks that the subject can reach may be stored, along with some information about the relative positions of such features/landmarks. This can include a list of discovered features/landmarks with connections to other features that can be directly accessed from the given feature. This type of high level connection diagram of the environment may be valuable in path planning.

The inferred map may also have metric information for each link based on the subject's path that gives an estimated distance between features. If the tracked subject has been globally initialized (this can be gained via GPS or other user initialization), their path information can provide global location estimates for the inferred features also. In order to be able to merge maps from different users, it may be important to have global initialization.

If a map of the building exists, then the map can be merged with the building's existing map. Otherwise, the building's map may be initialized with the discovered map.

The algorithm may then check, step 212, for features that have not been revisited for a long time (time that exceeds a threshold T), or features that may be inconsistent with new data, step 214, and logic may be provided to give an assessment of whether the feature was incorrectly created or the building has been altered, e.g., a room enlarged or partitioned. Associated features can, as a result, be removed from the map, step 216, and new features may be added as well. The algorithm may remain in this loop, step 218, until it is stopped, step 220.

Figure 3:
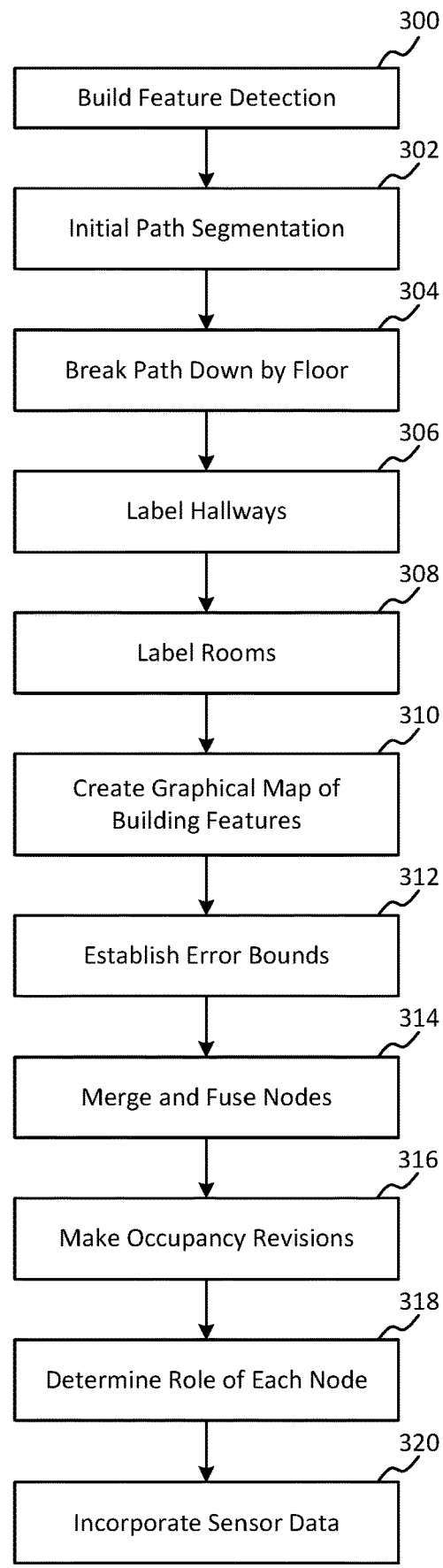
FIG. 3 illustrates an example flowchart that may be used to create graphical maps of building features, according to embodiments.

Step 208 of FIG. 2, creating the 3D feature graph, includes the following additional steps as further illustrated by FIG. 3.

Feature Detection, step 300: Stairs may be detected by stairs up or stairs down motions taken by the tracked subject that may be coincident with a significant pressure change. Elevators may be detected by acceleration and deceleration in vertical axis. Exits or entrances of the building may be detected by tracking the indoor/outdoor state of the tracked subject.

Figure 4:
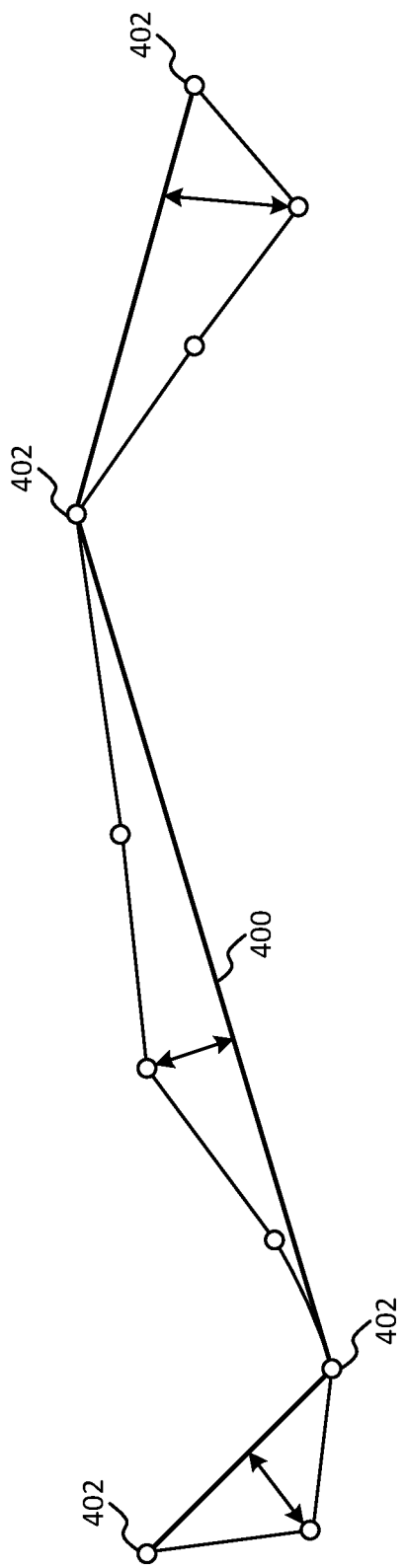
FIG. 4 illustrates an example segmentation of a path, according to embodiments.

Initial Path Segmentation, step 302: By using a segmentation algorithm such as a Ramer-Douglas-Peucker algorithm, each path can be broken into segments. The algorithm may select break points by enforcing a minimum excursion from the best fit line. See FIG. 4 for an example, where the break points 402, associated with the path 400, are represented by circles and indicated where the path 400 may be subject to segmentation.

Break Path Down by Floor, step 304: The path may be further broken down by elevation. Floor heights may be estimated.

Figure 5:
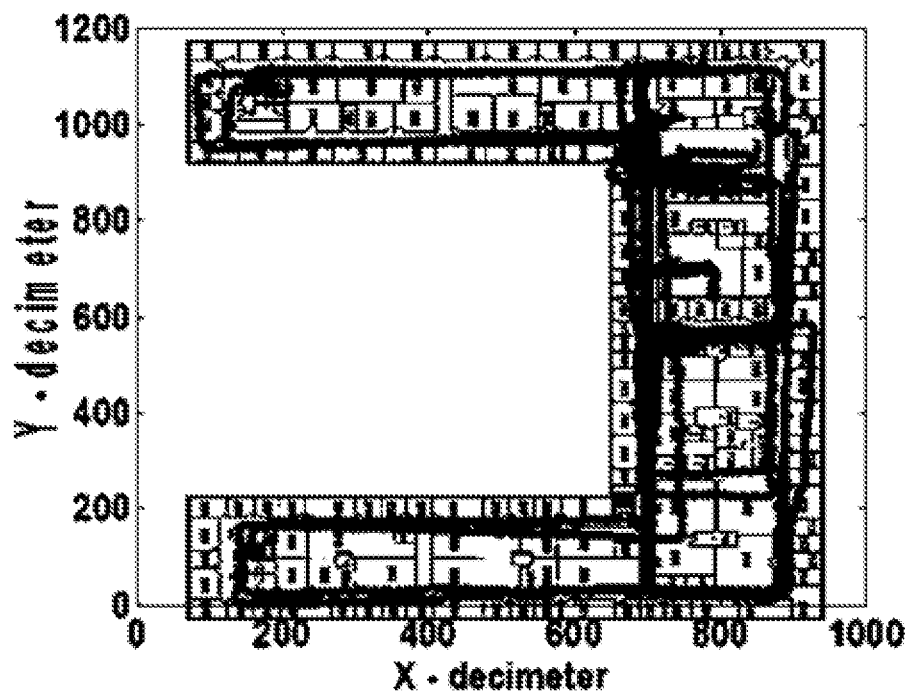
FIG. 5 illustrates example tracks collected in a building overlaid on a map of the building, according to embodiments.
Figure 6:
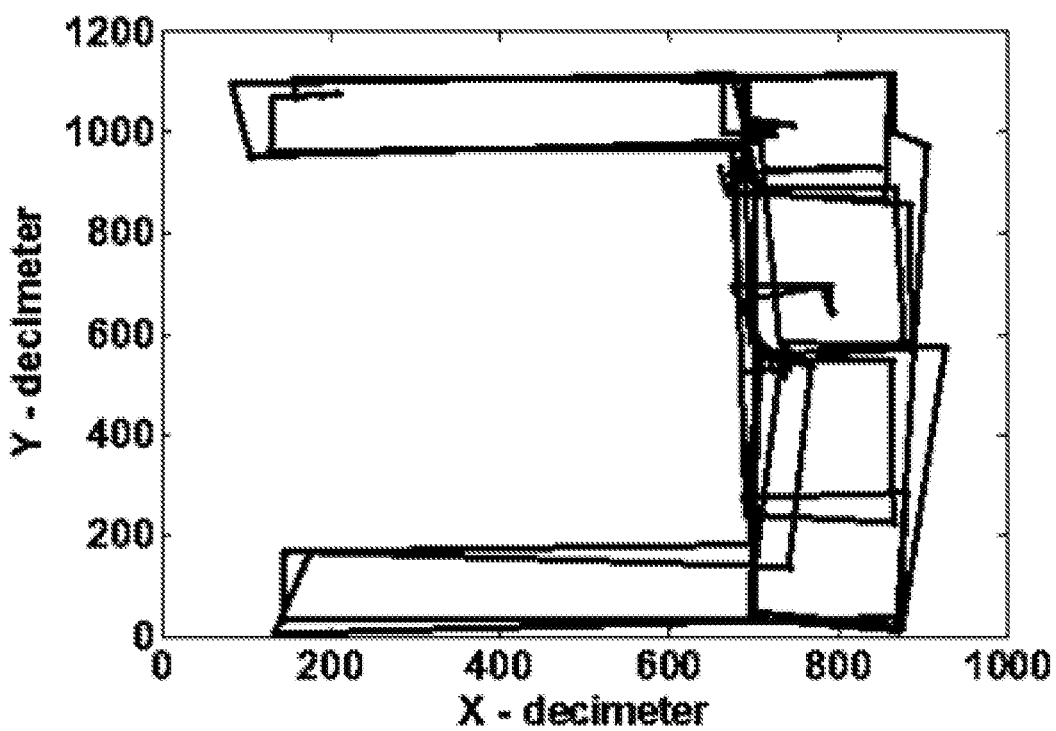
FIG. 6 illustrates example segments associated with the map of the building, according to embodiments.

Label Hallways, step 306: Long segments that exceed a minimum length (for example, as illustrated in FIG. 6) may be labeled as hallways. FIG. 5 further illustrates how segments or tracks collected from within a building may then be overlaid on a map of the building. As described herein, the tracks may be used to identify hallways, rooms, and the like.

Label Rooms, step 308: Rooms may be identified by a high density of short segments covering a small area. Average speed of walking is usually smaller in a room than in other spaces in a building.

Figure 7:
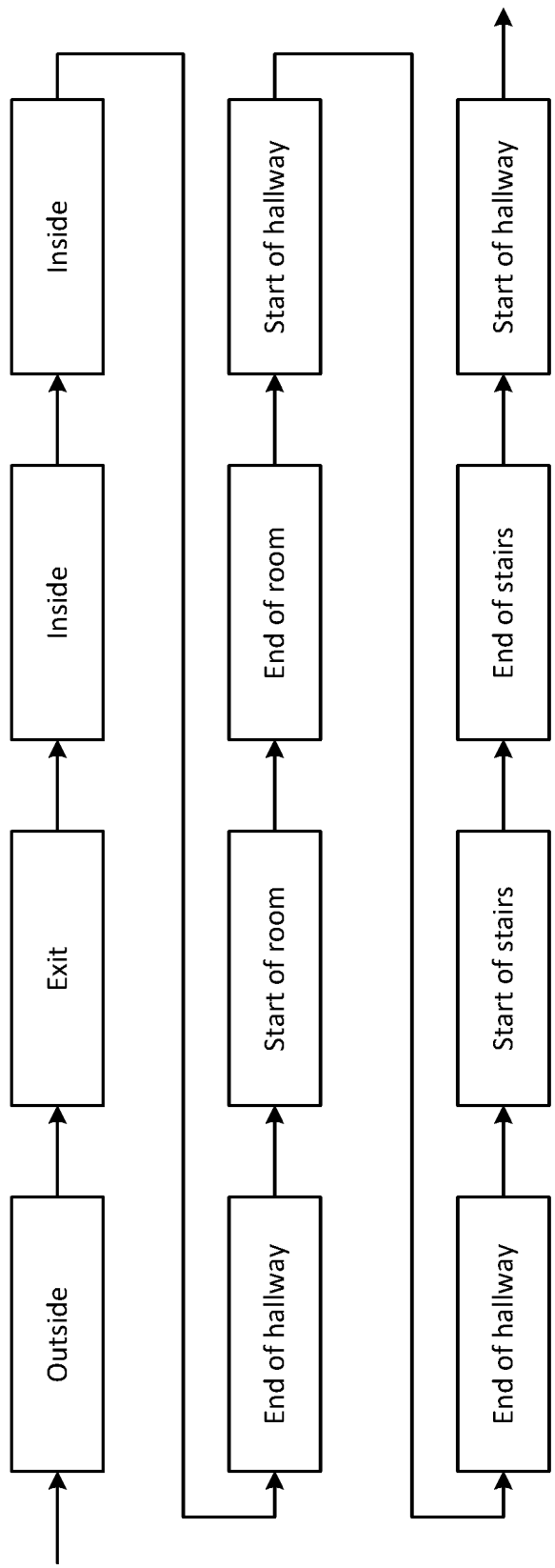
FIG. 7 illustrates an example sequence of events as a tracked subject walks in a building, according to embodiments.

Create Graphical Map of Building Features, step 310: As a tracked subject walks in a building, the algorithm may identify building features (e.g. hallways, stairs, elevators) and create a sequence of events (FIG. 7 describes a sequence of events as a tracked subject walks into and through a building, such as entering the building, walking down hallways, entering and exiting rooms, walking up and down stairs, etc.). This sequence becomes the basis for the creation of a graphical map. Each node may represent a feature and two nodes may be connected if they are associated with two consecutive events. For example, the location and confidence/error bound for a feature may be derived from the tracked subject's location and error bound at the time associated with the discovery of the feature. Thus, the location of the feature may be the location of the tracked subject at the time of the feature's discovery and the error bound of the feature location may be the error bound of the tracked subject's location at the time of the discovery of the feature. The error bound may be estimated by fitting a circle to the tracked subject's error bound.

Figure 8:
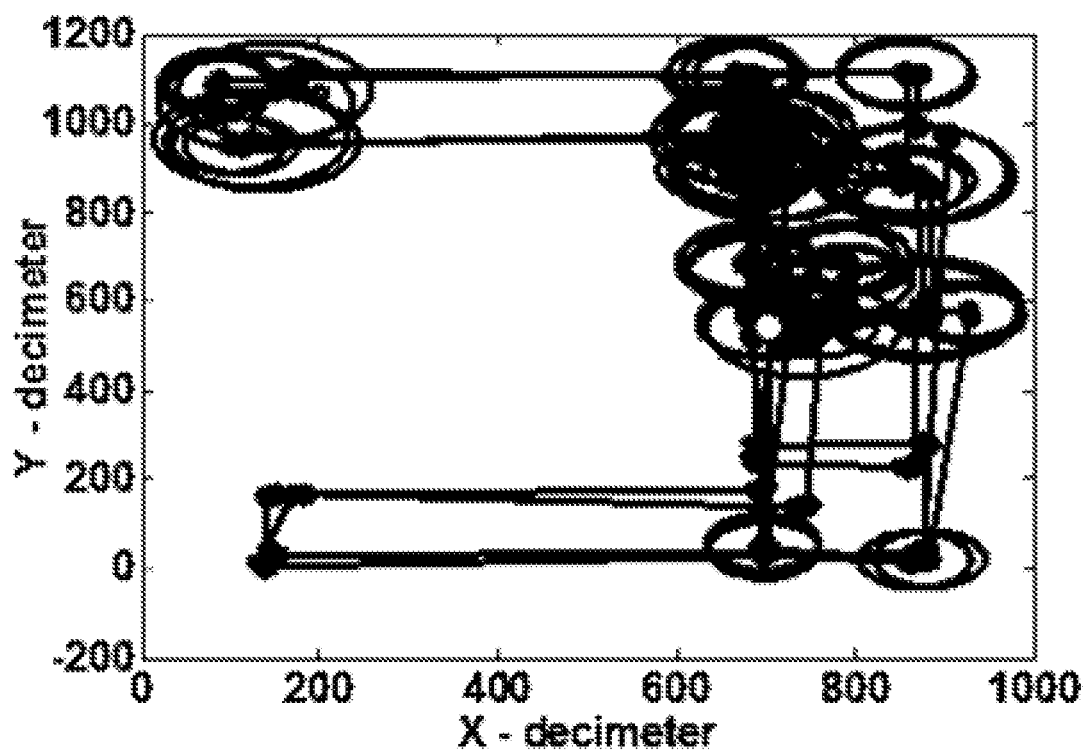
FIG. 8 illustrates example nodes and their associated types and error bounds, according to embodiments.

Establish Error Bounds, step 312: Location error bounds are error bounds on the confidence of the estimation of a user's location, which may be continuously updated. As shown in FIG. 8, it is assumed that the tracked subject started from a known global referenced location. When there was a change in location of the user, in one embodiment, an error circle may be created centered at the last known location with the radius equal to the distance the user traveled. This circle may continuously grow in all directions as time elapses and there is less confidence in the accuracy of the estimate of the user's location. The radius of this circle can equal the maximum distance the user has walked since the circle was created. If the user self corrects their location or receives an automated correction from an installed infrastructure system, e.g., NOKIA's installed beacons based on enhanced BLUETOOTH 4.0 low-energy technology and Wi-Fi standards, then the error circle may be reset based on the assessed error associated with the correction. The intersection area of all error circles associated with the tracked subject may include the area that subject may be in. Based on the assumption that the inaccuracy in the inertial path is only due to heading and scaling errors, the location of the user may be bounded inside this intersection area. This process represents a mechanism that may efficiently compute error bounds for location estimation. The error circle is only one example. Error information may be expressed in many other forms, such as a heat map expressing a complex distribution of the possible location of the user, or much simpler forms, such as any manner of polygon. The intersection area may also be approximated with a polygon. The error polygon can be simplified by its circumscribed circle.

Figure 9:
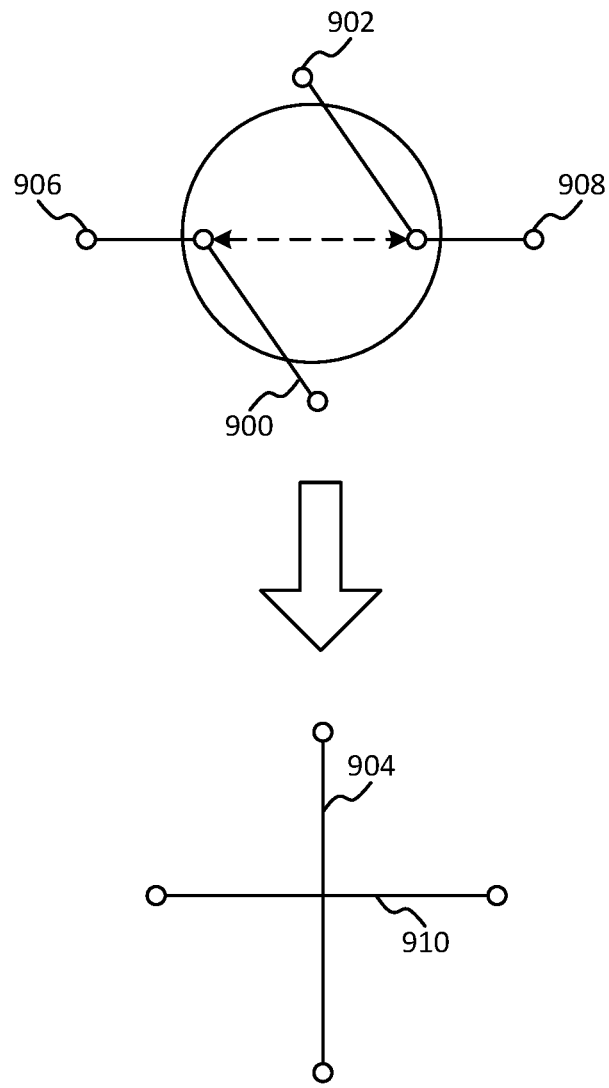
FIG. 9 illustrates an example of merging of nodes in a cluster, according to embodiments.
Figure 10:
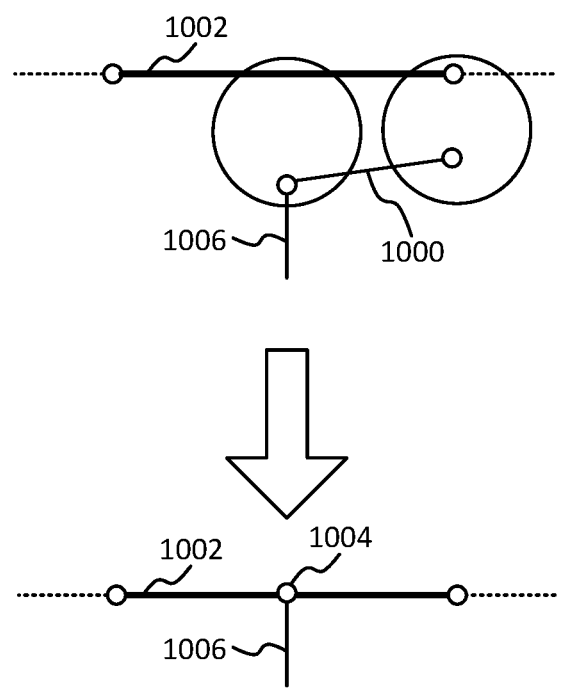
FIG. 10 illustrates an example of merging of segments, according to embodiments.

Merge and Fuse Nodes, step 314: Nodes (inferred features) that have the same type (e.g. hallway start, exit, or room) and are close to each other may be clustered and merged into one node. The location of a node may be a weighted average of locations of nodes in the cluster weighted by the nodes' occupancy (as explained in step 316 below) and inversely weighted by the error bounds for step 312. FIG. 9 shows how close nodes 900 and 902 may be clustered and merged into one node 904, while close nodes 906 and 908 may be clustered and merged into node 910. Another merge may happen when a hallway node 1000 is very close to another hallway 1002 (see FIG. 10). In this case the node 1000 may be moved to become a middle point 1004 in the hallway 1002. In FIG. 10, the combination of the above two rules may also result in the merging of a small hallway segment 1006 with a bigger hallway segment 1002. As shown in FIG. 10, the bold line for hallway 1002 may represent a higher occupancy number for nodes defining the bigger hallway.

Figure 11:
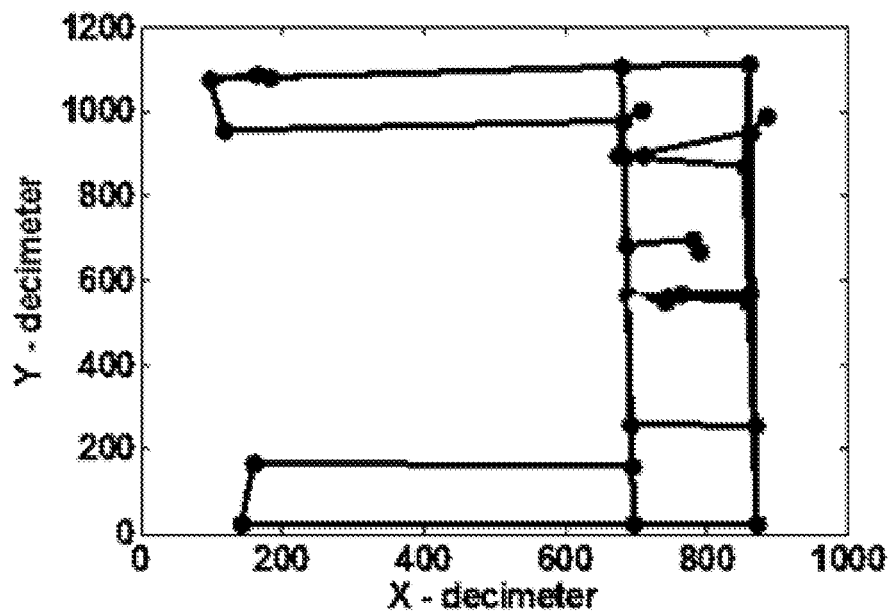
FIG. 11 illustrates example nodes after merge/simplification, according to embodiments.
Figure 12:
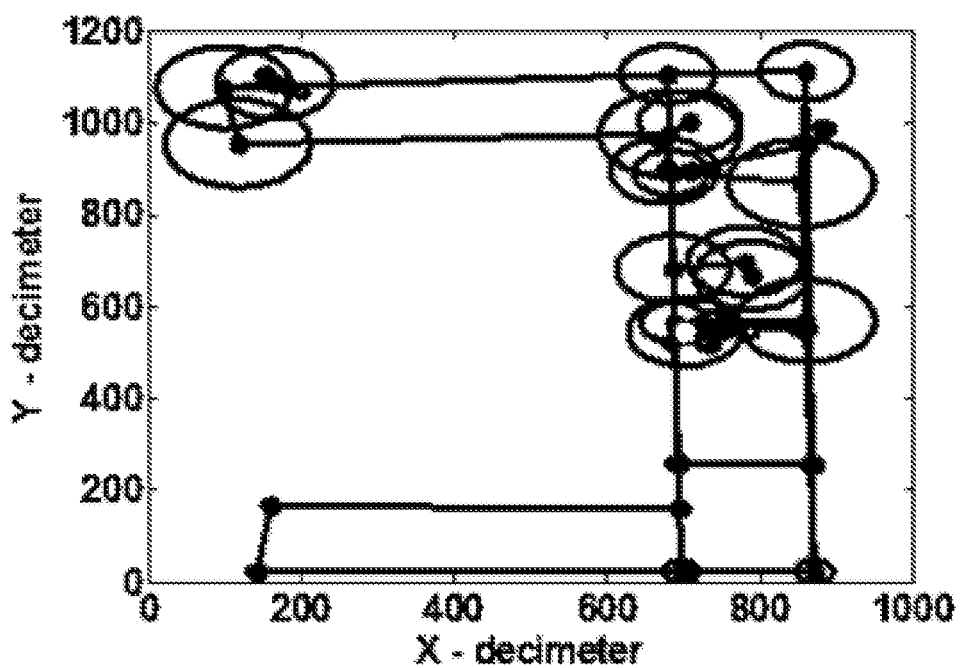
FIG. 12 illustrates an example final graph with error bounds, according to embodiments.

Make Occupancy Revisions, step 316: The algorithm may keep track of how many times a node has been revisited. Every time a node is created, its occupancy number may be initialized to 1, for example, and when it is revisited, that number may be incremented. When nodes in a cluster merge, the resulting node may have an occupancy number equal to the sum of occupancy numbers of nodes in the cluster. Nodes with a relatively low occupancy number may be removed from the graph. Occupancy numbers may give information about movement patterns in the building and the location of high traffic areas in the building. FIG. 11 illustrates an example of how the map from FIG. 6, as an example, may be simplified by removing nodes with relatively low occupancy. As shown in FIG. 12, the error bounds associated with the remaining nodes may also be plotted.

Determine Role of each Node, step 318: To help represent the map as a hierarchical graph, the role of each node can be determined. A node can be a decision point, an articulation point, a corner point, a leaf node, or a redundant node. A decision point may be a point where the user has the option of taking two or more different routes in the building. An articulation point may be a point where upon its removal the graph can be broken into two disjoint graphs. A redundant node may be a node that may not have any significance in describing the floor plan and can be merged with its neighbors. The role of a redundant node may, however, include adding more details about the shape of a space. A leaf node may be a dead-end node in the graph. For example, a room with one entrance can be described by a leaf node. These roles may become important when creating a hierarchical graph and when using this graph for navigation purposes.

Incorporate Sensor Data, step 320: If the computing system has access to sensor data, such as data from magnetic or acoustic sensors, or radio frequency information such as signal strength or angle of arrival from installed Wi-Fi or BLUETOOTH systems, then these sensor readings can be associated with inferred features to help uniquely identify them, or they may be geo-tagged, when sent to the server. Fusion algorithms can associate this data with segment points and create a map that represents the spatial distribution of this sensor data.

The above described techniques may provide various location and mapping based applications. For example, companies interested in the above mapping method or maps generated from the method may include both location-based services companies and dedicated mapping application providers such as: (1) infrastructure-based navigation providers, (2) indoor map creators, and (3) application developers. Examples of infrastructure-based navigation providers include NAVTEQ which is a NOKIA subsidiary that has enabled a mobile indoor navigation system for airports by installing antennas throughout the building. They also include QUALCOMM which is developing a similar Wi-Fi based solution. These solutions count on maps provided by the enterprise. Examples of indoor map creators include POINT INSIDE and MICELLO that are manually creating indoor maps of important buildings by converting floor plan images into interactive maps. Examples of application developers include providers of software to consumers, urban planners, law enforcement, first responders, event planners, and retailers.

Figure 13:
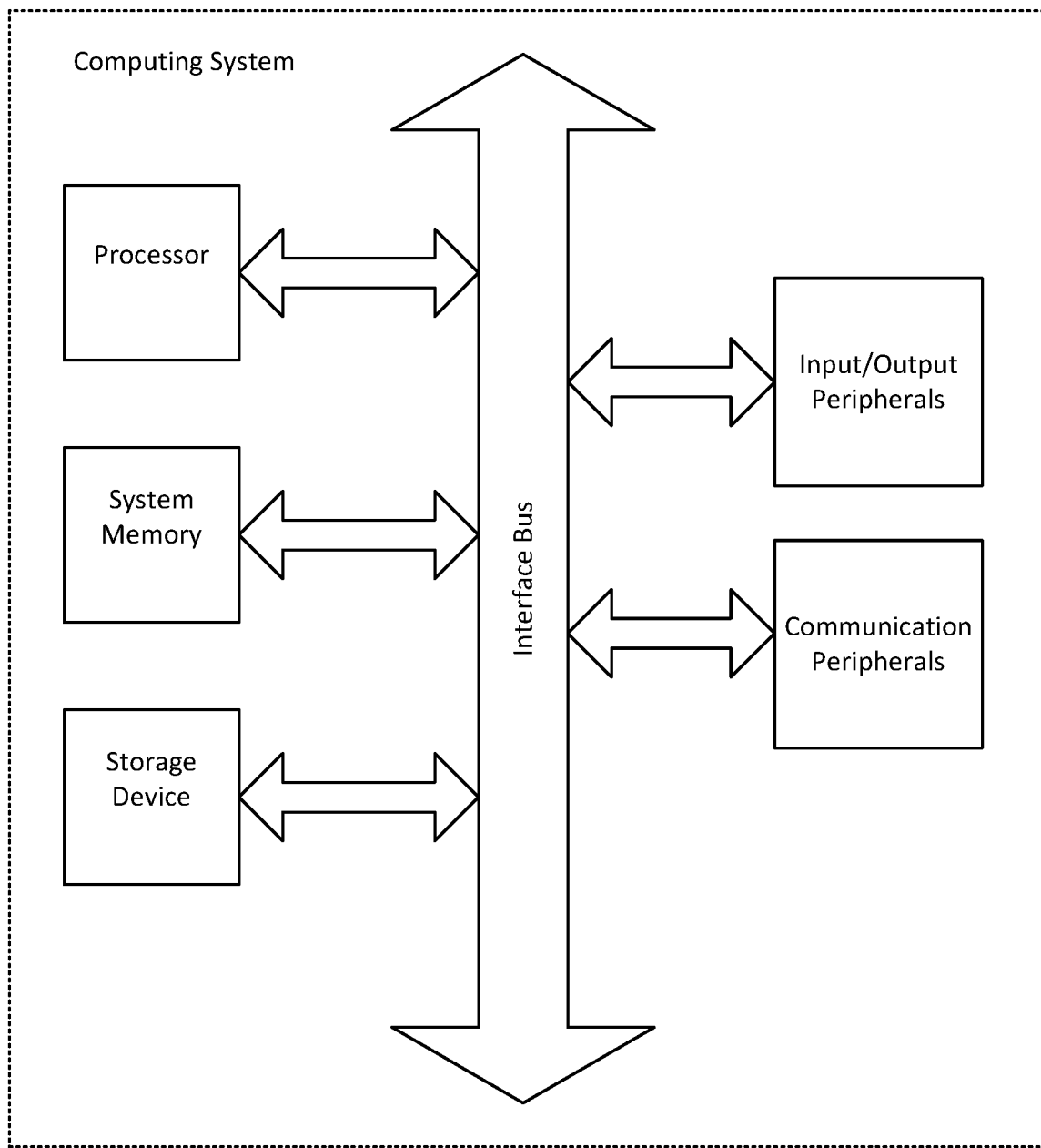
FIG. 13 illustrates an example computing system that may be used, according to embodiments.

The techniques described above can be implemented on a computing device associated with a user (e.g., a subject, a contributor, or any other persons described herein above. In an embodiment, the user may be a machine that is programmed to follow a path), a plurality of computing devices associated with a plurality of users, a server in communication with the computing device(s), or a plurality of servers in communication with the computing device(s). Additionally, the techniques may be distributed between the computing device(s) and the server(s). For example, the computing device may collect and transmit raw data to the server that, in turn, processes the raw data to generate a map. FIG. 13 describes a computing system that includes hardware modules, software modules, and a combination thereof and that can be implemented as the computing device and/or as the server.

In a basic configuration, the computing system may include at least a processor, a system memory, a storage device, input/output peripherals, communication peripherals, and an interface bus. The interface bus is configured to communicate, transmit, and transfer data, controls, and commands between the various components of the personal electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface that the user can use to provide input to the computing system and to receive an output from the computing system. This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communication network includes a cellular network, a Wi-Fi broadband network, a local area network (LAN), a wide area network (WAN), a telephony network, a fiber-optic network, or combinations thereof. In an example embodiment, the communication network includes the Internet and any networks adapted to communicate with the Internet. The communication network may also be configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage medium, such as volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the disclosures herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the disclosures herein. The accompanying claims and their equivalents are intended to cover such forms or modifications as would fall within the scope and spirit of the disclosures herein.

What is claimed:

1. A method for generating a venue map comprising:
receiving first inertial sensor data from a first tracked computing device within a venue;
estimating a location of the first tracked computing device within the venue based on the first inertial sensor data;
inferring one or more first venue features based only on the first inertial sensor data;
generating a first venue map based on the one or more inferred first venue features, wherein the first venue map represents a spatial distribution between the one or more inferred first venue features and an estimated location of each inferred first venue feature; and
combining at least a portion of the first venue map with one or more portions of a second venue map generated from a second tracked computing device within the venue based on inferred second venue features that are based on second inertial sensor data from the second tracked computing device, wherein at least one inferred second venue feature is matched to and combined with at least one inferred first venue feature to create a collaborative venue map.

2. The method of claim 1, further comprising:
determining path data indicative of the first tracked computing device's location over time within the venue;
overlaying a visual representation of the path data on the collaborative venue map.

3. The method of claim 1, wherein the spatial distribution is two-dimensional or three-dimensional.

4. The method of claim 1, wherein the first tracked computing device is one or more of a computer, a navigation unit, and a mobile phone.

5. The method of claim 1, wherein the venue is a building.

6. The method of claim 5, wherein the inferred first venue features and the inferred second venue features are one or more of a hallway, a room, a partition, a stairwell, an escalator, an entrance, an exit, and an elevator.

7. The method of claim 1, further comprising:
updating the first venue map based on one or more of a subsequently inferred venue feature, a user correction, known venue information, contextual information, sensor data from additional tracked computing devices within the venue, and a portion of a venue map generated from additional tracked computing devices within the venue.

8. The method of claim 7, wherein the user correction is entered through a user interface on the computing device.

9. The method of claim 1, further comprising:
storing the first venue map in a database managed by a server in network communication with the first tracked computing device.

10. A system comprising:
at least one processor;
at least one memory communicatively coupled to the at least one processor, the at least one memory bearing instructions that when executed on the processor cause the system to at least:
receive first inertial sensor data from a first tracked computing device within a venue;
estimate a location of the first tracked computing device within the venue based on the first inertial sensor data;
infer one or more first venue features based only on the first inertial sensor data;
generate a first venue map based on the one or more inferred first venue features, wherein the first venue map represents a spatial distribution between the one or more inferred first venue features and an estimated location of each inferred first venue feature; and
combine at least a portion of the first venue map with one or more portions of a second venue map generated from a second tracked computing device within the venue based on inferred second venue features that are based on second inertial sensor data from the second tracked computing device, wherein at least one inferred second venue feature is matched to and combined with at least one inferred first venue feature to create a collaborative venue map.

11. The system of claim 10, wherein the estimate of the location is further based on radiofrequency information, and wherein the radiofrequency information includes at least one of: a signal strength and an angle of arrival of a signal from a Wi-Fi or Bluetooth system.

12. The system of claim 10, further comprising instructions that cause the system to at least:
receive additional venue information from a server; and
update the collaborative venue map using the additional venue information.

13. The system of claim 12, wherein the additional venue information comprises one or more of sensor data from additional tracked computing devices within the venue, known venue information, contextual information, and one or more portions of additional venue maps generated from at least one additional tracked computing device within the venue.

14. The system of claim 10, further comprising instructions that cause the system to at least:
update the collaborative venue map based on one or more of a subsequently inferred feature and a user correction.

15. The system of claim 14, wherein the subsequently inferred feature is one or more of a hallway, a room, a partition, a stairwell, an escalator, an entrance, an exit, and an elevator.

16. The system of claim 10, further comprising instructions that cause the system to at least:
send the collaborative map to a server database managed by a server in network communication with one or more additional tracked computing devices within the venue.

17. A computer readable storage medium comprising instructions that, when executed on a computing system, cause the computing system to at least:
receive first inertial sensor data from a first tracked computing device within a venue;
estimate a location of the first tracked computing device within the venue based on the first inertial sensor data;
infer one or more first venue features based only on the first inertial sensor data;
generate a first venue map based on the one or more inferred first venue features, wherein the first venue map represents a spatial distribution between the one or more inferred first venue features and an estimated location of each inferred first venue feature; and
combine at least a portion of the first venue map with one or more portions of a second venue map generated from a second tracked computing device within the venue based on inferred second venue features that are based on second inertial sensor data from the second tracked computing device, wherein at least one inferred second venue feature is matched to and combined with at least one inferred first venue feature to create a collaborative venue map.

18. The computer readable storage medium of claim 17, wherein the estimate of the location is further based on radiofrequency information, and wherein the radiofrequency information includes at least one of: a signal strength and an angle of arrival of a signal from a Wi-Fi or Bluetooth system.

19. The computer readable storage medium of claim 17, wherein the inferred first venue features and the inferred second venue features include one or more of: a hallway, a room, a partition, a stairwell, an escalator, an entrance, an exit, and an elevator.

20. The computer readable storage medium of claim 17, wherein a time of discovery is associated with each inferred first venue feature.

21. The computer readable storage medium of claim 17, further comprising instructions that cause the computing system to at least:
update the first venue map based on one or more of: a subsequently inferred feature, a user correction, known venue information, contextual information, sensor data from additional tracked computing devices within the venue, and a portion of a venue map generated from additional tracked computing devices within the venue.

22. The computer readable storage medium of claim 21, wherein the venue data comprises one or more of: sensor data, inferred venue features, location data, and venue maps.

23. The computer readable storage medium of claim 17, further comprising instructions that cause the computing system to at least:
determining path data indicative of the first tracked computing device's location over time within the venue;
overlay a visual representation of the path data on the collaborative venue map.

24. The computer readable storage medium of claim 17, further comprising instructions that cause the computing system to at least:
store the first venue map in a database managed by a server in network communication with the first tracked computing device.

* * * * *